May 16, 1950     F. J. BRUGMANN     2,507,622
SPRING ENGAGING HOOK ASSEMBLY FOR BRAKE SPRING TOOLS
Filed Oct. 29, 1948
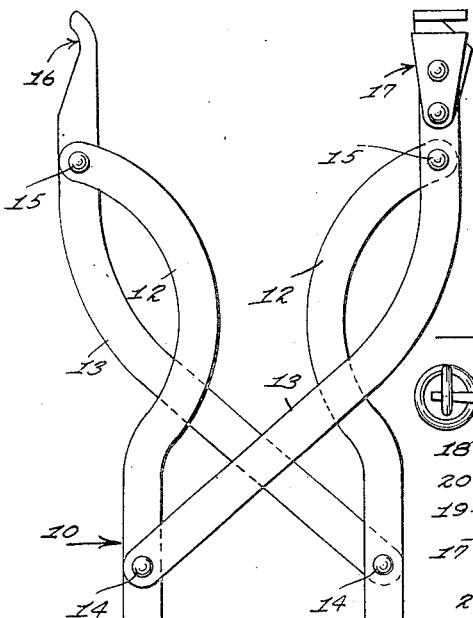
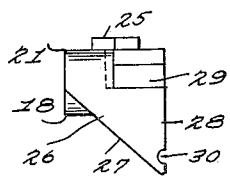
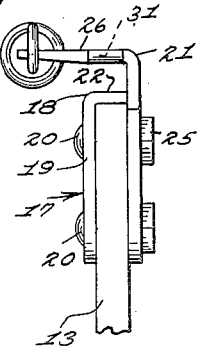
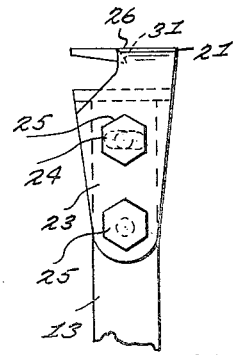
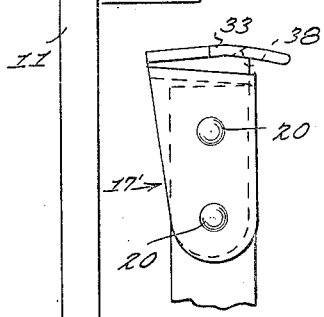
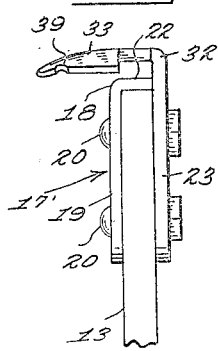
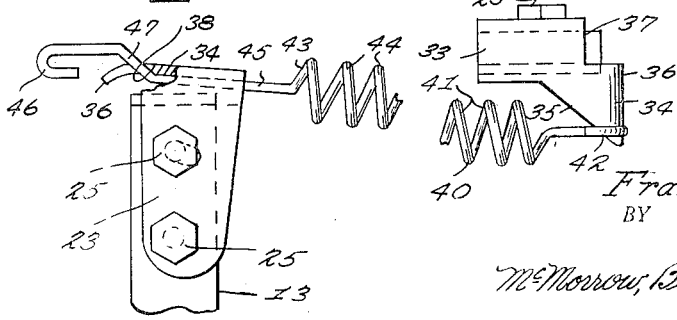
INVENTOR.
Frank J. Brugmann
BY
McMorrow, Berman + Davidson
ATTORNEYS Patented May 16, 1950

2,507,622

UNITED STATES PATENT OFFICE 2,507,622

SPRING ENGAGING HOOK ASSEMBLY FOR BRAKE SPRING TOOLS

Frank J. Brugmann, Greeley, Colo.

Application October 29, 1948, Serial No. 57,257

5 Claims. (Cl. 29—283)

This invention relates to improvements in hand tools for removing and applying the brake springs of automotive vehicles, and more particularly to an improved spring hook assembly for such a tool. I have also filed application Serial No. 611,818 on August 21, 1945, and now abandoned, and application Serial No. 768,151 on August 12, 1947, for similar devices.

It is among the objects of the invention to provide an improved brake spring tool including a plier or tong device having on one jaw a pointed finger engageable in a spring receiving brake shoe aperture, and a spring engaging hook assembly on its opposite jaw, which hook assembly is operated to firmly engage brake springs of various sizes and shapes for assembling the springs with or removing them from brake mechanisms, which includes at least one removable part for applying gripping pressure to springs engaged thereby so that the springs may be turned and otherwise manipulated by the tool, and which assembly is simple and durable in construction, economical to manufacture, and effective to greatly facilitate the application and removal of brake springs.

Other objects and advantages will become apparent from a consideration of the following description and the appended claims in conjunction with the accompanying drawing wherein:

Figure 1 is a longitudinal elevation of a brake spring plier showing the application thereto of a brake spring hook assembly illustrative of the invention;

Figure 2 is a top plan view of the brake spring hook assembly illustrated in Figure 1;

Figure 3 is a front elevation of the spring hook assembly illustrated in Figures 1 and 2, showing a fragmentary portion of a plier jaw in operative association with the hook assembly;

Figure 4 is a side elevation of the spring hook assembly and jaw fragment illustrated in Figure 3;

Figure 5 is a side elevation of the opposite side of the spring hook assembly and jaw fragment illustrated in Figure 4;

Figure 6 is a front elevation similar to Figure 3, showing a somewhat modified form of spring hook assembly;

Figure 7 is a top plan view similar to Figure 2 and showing the modified form of hook assembly illustrated in Figure 6 with a brake spring operatively engaged thereby; and Figure 8 is a view similar to Figure 4 of the modified form of spring hook assembly and showing the hook assembly operatively engaging a brake spring of a different form from that illustrated in Figure 7.

With continued reference to the drawing, the pliers or tongs, generally indicated at 10, comprise a pair of spaced apart, elongated side members each having a substantially straight handle portion 11 and a curved end portion 12, the two curved end portions being directed away from each other so that the ends of the curved portions are positioned somewhat outwardly of the corresponding handles 11. Each side member is provided in the end of its curved portion with an aperture and with a second aperture in its handle portion near the corresponding curved end portions. A pair of curved jaws 13 are each provided at one end with an aperture receiving respective fasteners, such as rivets 14, extending through the jaws and through the handles of the corresponding side members. The jaws are crossed over between the side members and each jaw is pivotally connected near its outer end to a corresponding side member at the outer end of the curved portion of the latter by a respective fastener, such as the rivets 15. In this arrangement, each jaw 13 is connected at one end to one side member intermediate the length of the latter and is pivotally connected to the end of the opposite side member at a location intermediate the length of the jaw.

This construction provides a plier having a pair of jaws which are movable toward and away from each other over an extremely wide range of movement and in which the two jaws are maintained substantially parallel to each other at all times so that there is substantially no tilting or inclination of one jaw relative to the other.

One of the jaws 13 has on its outer, free end a tapered, outwardly curved finger 16 for engagement in a spring end receiving aperture in a brake shoe and the other jaw is provided on its outer or free end with a spring hook assembly for engaging a brake spring at or near the end opposite that engaged in the brake shoe aperture in which the tong 16 is received and stretching the spring for applying such opposite end of the spring or removing it from an aperture or spring anchoring pin.

As these brake shoe retracting springs are stiff and strong, considerable difficulty has been experienced in applying and removing these springs with ordinary tools or special tools now available for this purpose, as the spring end engaged with the anchoring pin or aperture must frequently be turned to a considerable angle and manipu-lated to bring it into engagement with or remove it from the anchoring structure, which structure may be a fixed pin, an aperture in a fixed part of the brake mechanism or an aperture in the opposite brake shoe corresponding to the aperture in which the finger 16 of the brake plier is engaged.

As there are various types of brake shoe retracting springs and as these springs vary considerably in length and thickness of the wire of which they are formed, it has not heretofore been possible to provide a tool of universal application capable of applying and removing substantially all types of brake shoe retracting springs now in use.

The hook assembly 17 of the present invention is capable of such universal application and is also arranged to firmly grip a spring so that the spring can be easily manipulated by the brake spring tool to quickly apply the brake spring to or remove it from the associated brake mechanism.

One form of brake hook assembly particularly adapted for the above described purposes, is illustrated in Figures 2, 3 and 4 and a somewhat modified form of hook assembly is illustrated in Figures 5 to 8 inclusive, and generally designated at 17'.

Referring now to Figures 2, 3 and 4 particularly, the spring hook assembly 17 comprises a bearing plate 18 of flat, rectangular cross sectional shape having an elongated portion 19 overlying one side of the plier jaw 13 and provided with two spaced apart apertures receiving respective rivets or bolts 20. These rivets or bolts extend through corresponding apertures in the jaw 13 and are also used to secure the hook 21 of the assembly to the jaw. The bearing plate 18, in addition to the portion 19 overlying the side of the jaw, has an angularly disposed portion 22 which is disposed substantially perpendicular to the portion 19 and overlies the end of the jaw 13.

The hook 21 is also of flat, rectangular cross-sectional shape and has an elongated portion 23 overlying the side of the jaw opposite the bearing plate portion 19 and provided near its end inwardly of the jaw with an aperture receiving the corresponding bolt or rivet 20. This hook portion 23 is provided with an elongated slot 24 receiving the bolt or rivet 20 nearest the outer end of the jaw so that the hook is pivotally secured to the jaw for rocking movement to a limited extent. The fasteners 20 are provided with nuts or rivet heads 25 which overlie the portion 23 of the hook and secure the hook in operative assembly with the plier jaw 13 and the bearing plate 18.

The hook is also provided with an angularly disposed portion 26 which overlies and is spaced from the angularly disposed portion 22 of the bearing plate and is disposed substantially perpendicular to that portion 23 of the hook which extends along the corresponding side of the jaw.

The angularly disposed portion 26 of the hook is tapered in thickness outwardly from the adjoining end of the hook portion 23 and is provided with an inclined rear edge 27, which together with the tapering thickness provides a pointed outer end for the hook portion 26. The front edge 28 of the hook portion 26 is substantially straight and perpendicular to the hook portion 23 and the jaw 13, and is provided with a rectangular, spring receiving slot 29 at the corresponding end of hook portion 23 and with a rounded notch 30 disposed outwardly of the notch 29 and near the pointed outer end of the hook portion 26. The hook portion 26 has at the bottom or inner end of the rectangular notch 29 an upwardly and forwardly inclined surface 31, the purpose of which will presently appear.

Referring now to Figures 5 and 6, the bearing plate used in this modified form of the invention is the same bearing plate 18 illustrated in Figures 2, 3 and 4 and described above, and the hook 32 has the same portion 23 overlying the side of the jaw opposite the bearing plate as described above. Two fasteners 20, preferably in the form of rivets, extend through registering openings in the bearing plate 18, the plier jaw 13 and the hook portion 23 to secure the bearing plate and the hook in operative assembly with the jaw, the portion 23 of the hook having an elongated slot receiving the fastener 20 nearest the end of the jaw 13 to provide a limited freedom of pivotal movement of the hook relative to the jaw.

The hook 32 has an angularly disposed portion 33 overlying and spaced from the angularly disposed portion 22 of the corresponding bearing plate 18 and disposed substantially perpendicular to the portion 23 of the hook extending along the corresponding side of the jaw 13.

The portion 33 of hook 32 includes a rectangular portion overlying the end of the jaw member 13 and a triangular portion 34 offset laterally from the rectangular portion and tapered in thickness outwardly from the rectangular portion. The portion 34 has an outwardly and forwardly inclined rear edge 35 which, together with the tapering thickness of portion 34, provides a pointed outer end of the hook part 33 and this triangular portion 34 has a straight forward edge 36 which is substantially perpendicular to the hook portion 23 and the jaw 13. The triangular portion 34 is curved outwardly and downwardly near its front edge 36, as particularly illustrated in Figures 6 and 8 in order to facilitate inserting this portion of the hook under a spring attached to a brake mechanism. The hook part 33 has, adjacent the adjoining end of the hook part 23, a rectangular, spring-receiving notch 37 and has a forwardly and upwardly inclined edge 38 at the bottom or inner end of the notch 37. The portion 33 is also provided in its front edge 36 near its pointed end with a rounded notch 39 adapted to engage certain types of brake springs.

The engagement of the improved hook assembly with two different types of brake springs is illustrated in Figures 7 and 8. It is to be understood, however, that the hook assembly is not limited in its application to these two particular types of brake springs but is operatively engageable with substantially all types of brake shoe retracting springs now in use.

The brake spring 40, illustrated in Figure 7, is of the type having a coil portion 41 and a generally semi-circular hook 42 at each end of the coil portion. In applying such a spring, one of the spring hooks is engaged in the proper brake shoe aperture and the finger 16 of the brake plier is inserted into this same aperture. The angularly disposed end portion of the hook on the opposite jaw of the plier is then brought into engagement with the free loop or eye 42 of the spring with the spring loop seated in the rounded notch 30 or 39. The handles 11 of the plier are then forced toward each other, stretching the spring and bringing the hook engaged spring loop into position for engagement with a spring anchoring pin or for insertion into a spring receiving aperture in the brake mechanism, as the case may be. The hook engaged end of the spring may then be manipulated to engage it with the pin or in the aperture whereupon the hook is easily withdrawn from the associated spring loop. The spring is removed from the brake mechanism in an obvious manner by first engaging the finger 16 in the brake shoe aperture at one end of the spring and engaging the angularly disposed portion of the hook carried by the other jaw of the plier or tong in the loop at the opposite end of the spring, stretching the spring and removing the hook engaged end thereof from engagement with the brake mechanism.

The spring 43, illustrated in Figure 8, has a coil portion 44, a straight portion or shank 45 extending from at least one end of the coil portion and a narrow loop or eye 46 at the outer end of the shank 45. Intermediate the hook 46 and the coils 44, the shank is provided with an inclined or angularly disposed offset 47. In applying or removing this type of spring, the portion of the shank between the offset 47 and the coils 44 is engaged between the angularly disposed portion 26 or 33 of the hook with the offset portion 47 of the spring bearing against the inclined inner edge 31 or 38 of the spring receiving notch 29 or 37. It will be noted that the side or edge of the notch nearest the pointed end of the angularly disposed portion of the hook is opposed to the offset portion of the spring in both cases to maintain the spring in the notch. With this arrangement as spring stretching pressure is exerted on the handles of the plier 10, the hook is pivoted relative to the plier jaw upon which it is mounted and compresses the shank portion of the spring between the angularly disposed portion of the hook and the angularly disposed portion 22 of the bearing plate 18 to firmly grip the spring in the hook assembly of the tool. With the spring so gripped, it is easy to apply the loop 46 to that portion of the brake mechanism to which such end of the spring is anchored.

Regardless of the type of brake shoe retracting spring to be removed or applied, the improved spring hook assembly will firmly engage the spring near its free end so that the free end of the spring can be easily engaged with the brake shoe structure constituting an anchor therefor.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claim:

1. In a brake spring applying tool including a jaw, a spring hook assembly secured to said jaw and comprising a bearing plate having a portion extending along one side of the jaw and a substantially perpendicularly disposed portion overlying the end of the jaw, a flat hook having a shank portion extending along the side of the jaw opposite said bearing plate, and a substantially perpendicularly disposed portion overlying and spaced from the portion of said bearing plate overlying said jaw end, and fasteners securing said bearing plate and said hook to said jaw in operative assembly.

2. In a brake spring tool including a plier device having a jaw, a spring engaging hook assembly for said jaw comprising a bearing plate having a portion extending along one side of the jaw and secured to the latter and an angularly disposed portion overlying the end of the jaw, a hook having a portion extending along the opposite side of the jaw and an angularly disposed portion overlying the angularly disposed portion of said bearing plate, said jaw and the portion of said bearing plate extending along one side of said jaw having spaced apart registering apertures therein and said hook having in the portion thereof extending along said opposite side of said jaw a slot disposed adjacent said angularly disposed portion of the hook and an aperture spaced from said slot, and respective fastening elements extending through said bearing plate, said jaw and said hook securing said bearing plate and said hook in operative assembly with said jaw, said slot providing a limited freedom of pivotal movement of said hook relative to said jaw for rocking movement of the angularly disposed portion of said hook relative to the angularly disposed portion of said bearing plate.

3. In a brake spring tool including a plier device having a jaw, a spring engaging hook assembly mounted on said jaw and comprising a bearing plate having a portion extending along one side of the jaw and an angularly disposed portion overlying the end of the jaw, a hook having a portion extending along the opposite side of the jaw and an angularly disposed portion overlying the angularly disposed portion of said bearing plate, and means securing said bearing plate and said hook to said jaw for pivotal movement of said hook relative to said jaw, the angularly disposed portion of said hook being outwardly tapered in thickness and width and having a spring receiving notch therein adjacent the end of said hook portion extending along the side of the jaw.

4. In a brake spring tool including a plier device having a jaw, a spring engaging hook assembly mounted on said jaw and comprising a bearing plate having a portion extending along one side of the jaw and an angularly disposed portion overlying the end of the jaw, a hook having a portion extending along the opposite side of the jaw and an angularly disposed portion overlying the angularly disposed portion of said bearing plate, and means securing said bearing plate and said hook to said jaw for limited pivotal movement of said hook relative to said jaw, the angularly disposed portion of said hook being outwardly tapered in thickness and width and having a rectangular spring receiving notch therein adjacent the end of said hook portion extending along the side of the jaw, said hook having an inclined surface at the inner end of said notch to engage an angularly offset portion of a spring engaged between said hook and said bearing plate.

5. In a brake spring tool including a plier device having a jaw, a spring engaging hook assembly mounted on said jaw and comprising a bearing plate having a portion extending along one side of the jaw and an angularly disposed portion overlying the end of the jaw, a hook having a portion extending along the opposite side of the jaw and an angularly disposed portion overlying and spaced from the angularly disposed portion of said bearing plate, and means securing said bearing plate and said hook to said jaw for limited pivotal movement of said hook relative to said jaw, the angularly disposed portion of said hook being outwardly tapered in thickness and width to provide a pointed outer end and a front edge disposed substantially perpendicular to the jaw, said angularly disposed portion having a spring receiving notch in the front edge thereof.

FRANK J. BRUGMANN.

REFERENCES CITED

The following references are of record in the file of this patent:

UNITED STATES PATENTS

| Number | Name | Date |
|---|---|---|
| 118,254 | Mather | Aug. 22, 1871 |
| 298,910 | Stevenson | May 20, 1884 |
| 418,794 | Hearn | Jan. 7, 1890 |
| 973,760 | Cirves | Oct. 25, 1910 |
| 983,782 | Stewart | Feb. 7, 1911 |
| 1,582,011 | Hart | Apr. 20, 1926 |
| 1,862,326 | Altice | June 7, 1932 |
| 1,917,878 | O'Donnell | July 11, 1933 |
| 1,938,102 | Hill | Dec. 5, 1933 |
| 1,949,343 | Wood | Feb. 27, 1934 |
| 1,951,953 | Tollonitsch | Mar. 20, 1934 |
| 1,953,930 | Dyal | Apr. 10, 1934 |
| 2,329,591 | Christian | Sept. 14, 1943 |
| 2,474,940 | Hansen | July 5, 1949 |